US012749482B2

(12) United States Patent
Jindrich

(10) Patent No.: US 12,749,482 B2
(45) Date of Patent: Sep. 29, 2026

(54) METHOD, DEVICE, COMPUTER PROGRAM AND COMPUTER READABLE STORAGE MEDIUM FOR DETERMINING A COMMAND

(71) Applicant: Eaton Intelligent Power Limited, Dublin (IE)

(72) Inventor: Šindelár Jindrich, Nova Ves nad Luznici (CZ)

(73) Assignee: EATON INTELLIGENT POWER LIMITED, Dublin (IE)

( * ) Notice: Subject to any disclaimer, the term of this patent is extended or adjusted under 35 U.S.C. 154(b) by 185 days.

(21) Appl. No.: 18/264,878

(22) PCT Filed: Feb. 15, 2022

(86) PCT No.: PCT/EP2022/053596

§ 371 (c)(1),
(2) Date: Aug. 9, 2023

(87) PCT Pub. No.: WO2022/171886

PCT Pub. Date: Aug. 18, 2022

(65) Prior Publication Data

US 2024/0112671 A1 Apr. 4, 2024

(30) Foreign Application Priority Data

Feb. 15, 2021 (GB) ..................................... 2102117

(51) Int. Cl.
*G10L 15/187* (2013.01)
*G10L 15/08* (2006.01)

(52) U.S. Cl.
CPC ...... *G10L 15/187* (2013.01); *G10L 2015/088* (2013.01)

(58) Field of Classification Search
CPC ........................ G10L 15/187; G10L 2015/088
See application file for complete search history.

(56) References Cited

U.S. PATENT DOCUMENTS 6,016,470 A 1/2000 Shu
6,910,012 B2 * 6/2005 Hartley .................. G10L 15/19 704/E15.021

(Continued)

FOREIGN PATENT DOCUMENTS

CN 114863936 A * 8/2022 ............. G10L 17/24
JP 2015087544 A 5/2015

*Primary Examiner* — Bhavesh M Mehta
*Assistant Examiner* — Eunice Lee
(74) *Attorney, Agent, or Firm* — LEYDIG, VOIT & MAYER, LTD.

(57) ABSTRACT

A method for operating a device based on a command, including operating the device in a first state, providing a set of pseudo words, each pseudo word representative of more than one known real word, which is provided for a pronunciation model, and mapping an acoustic signal to phonemes by an acoustic model. The method further includes determining at least one output word dependent on the phonemes and pronunciation model and determining the command based on the at least one output word, the set of pseudo words and a set of command words. The method further includes resuming operating the device in the first state by discarding the command based on a determination that the command comprises a pseudo word, and changing the device to a second state in which the device performs an action associated with the command based on a determination that the command is not discarded.

15 Claims, 5 Drawing Sheets

Legend:
S1: Mapping an acoustic signal
S2: Determining at least one output word
S3: Set of pseudo words provided
S4: Command is determined

(56) References Cited

U.S. PATENT DOCUMENTS

| | | | | |
|---|---|---|---|---|
| 11,817,094 | B2 * | 11/2023 | Bauer | G10L 15/02 |
| 2001/0053974 | A1 * | 12/2001 | Lucke | G10L 15/187<br>704/E15.02 |
| 2004/0054533 | A1 * | 3/2004 | Bellegarda | G10L 15/187<br>704/254 |
| 2009/0112593 | A1 * | 4/2009 | Konig | G10L 15/26<br>704/251 |
| 2014/0142925 | A1 * | 5/2014 | Gish | G10L 15/063<br>704/10 |
| 2021/0049927 | A1 * | 2/2021 | Saha | G10L 15/187 |

* cited by examiner

Legend:

S1: Mapping an acoustic signal
S2: Determining at least one output word
S3: Set of pseudo words provided
S4: Command is determined

Fig 3

| 1 | 2 | 3 | 4 | 5 |
|---|---|---|---|---|
| C | V | C | V | C |
| V | C | C | V | C |
| C | V | C | C | C |
| C | C | V | C | C |
| C | C | C | V | C |
| C | V | C | C | V |

U

Fig 4

| | 1 | 2 | 3 | 4 | 5 |
|---|---|---|---|---|---|
| B | **33** | 4 | 8 | 4 | 0 |
| T | 17 | 20 | 35 | **23** | **74** |
| Z | 0 | 1 | 13 | 1 | 12 |
| R | **35** | **34** | **45** | 12 | 8 |
| S | **66** | 6 | 28 | 11 | 32 |
| N | 14 | **24** | **40** | **32** | **57** |
| D | 30 | 9 | 16 | 10 | 32 |
| L | 17 | 13 | **40** | **26** | 50 |
| ER | 2 | **25** | 5 | 17 | **63** |
| TH | 3 | 3 | 4 | 2 | 2 |

Fig 5

| | 1 | 2 | 3 | 4 | 5 |
|---|---|---|---|---|---|
| AW | 2 | 5 | 5 | 2 | 1 |
| AH | **36** | 31 | **20** | **126** | 3 |
| UW | 0 | 5 | 6 | 6 | **5** |
| IH | **18** | **71** | 6 | **55** | 0 |
| OW | 1 | 12 | 4 | 7 | **5** |
| EH | **13** | **37** | **19** | 11 | 0 |
| IY | 4 | 26 | 6 | **34** | **44** |
| AA | 4 | 20 | 9 | 0 | 0 |
| AE | 12 | **32** | **12** | 1 | 0 |
| AY | 1 | 17 | 4 | 24 | 4 |

Fig 6

| 1 | 2 | 3 | 4 | 5 | |
|---|---|---|---|---|---|
| AH | IH | AH | AH | IY | V |
| IH | EH | EH | IH | OW | |
| EH | AE | AE | IY | OW | |
| | ⇧ | | ⇧ | | |
| C | V | C | V | C | |
| ⇩ | | ⇩ | | ⇩ | |
| S | R | R | N | T | V |
| R | ER | L | L | ER | |
| B | N | N | T | N | |

Fig 7

| | | | | | | |
|---|---|---|---|---|---|---|
| j=0 | S | IH | R | AH | T | i=0 |
| j=1 | R | EH | L | IH | ER | |
| j=2 | B | AE | N | IY | N | |
| j=0 | AH | R | R | AH | T | i=1 |
| j=1 | IH | ER | L | IH | ER | |
| j=2 | EH | N | N | IY | N | |

METHOD, DEVICE, COMPUTER PROGRAM AND COMPUTER READABLE STORAGE MEDIUM FOR DETERMINING A COMMAND

CROSS REFERENCE TO RELATED APPLICATIONS

This application is a U.S. National Phase application under 35 U.S.C. § 371 of International Application No. PCT/EP2022/053596, filed on Feb. 15, 2022, and claims benefit to Great Britain Patent Application No. 2102117.5, filed on Feb. 15, 2021. The International Application was published in English on Aug. 18, 2022 as WO 2022/171886 A1 under PCT Article 21(2).

FIELD

The present invention relates to a method, a device, a computer program and a computer readable storage medium for determining a command.

BACKGROUND

Speech recognition is a technology which is frequently used in commercial products. The trend moves into the industrial environment. But while consumer products often delegate the processing of speech into a cloud, devices, in particular industrial devices, need to perform the processing locally and offline, as an internet connection is often not available and an industrial environment requires high cyber security levels.

SUMMARY

In an embodiment, the present disclosure provides a method for determining a command, comprising providing a set of pseudo words, wherein each pseudo word of the set of pseudo words is representative for more than one real word of a set of real words, which is provided for a pronunciation model. The method further comprises mapping an acoustic signal to phonemes by an acoustic model and determining at least one output word dependent on the phonemes and the pronunciation model. The method further comprises determining the command dependent on the at least one output word, the set of pseudo words and a set of command words, wherein dependent on the command a device performs an action.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 3-7 show matrices for composing a pseudo word.

DETAILED DESCRIPTION

Figure 1:
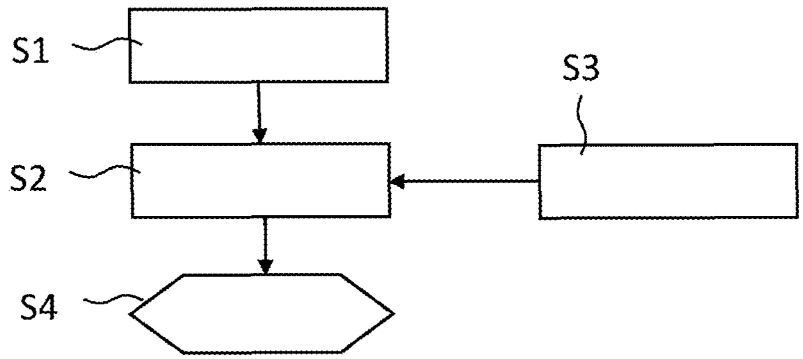
FIG. 1 shows a flowchart of a method for determining a command according to an exemplary embodiment.

An object to be solved is to specify a particularly fast method for determining a command. Furthermore, a device and a computer program, which are able to perform such a method, are specified. In addition, a computer readable storage medium with such a computer program is specified.

The object is solved by the subject-matter of the independent claims. Advantageous embodiments, implementations and further developments are the subject-matter of the respective dependent claims.

A method for determining a command is provided. For example, a device can perform an action dependent on the command. In particular, the command is representative for the action.

The device is, for example, an embedded device comprising a combination of a computer processor, a computer memory and an output peripheral device. For example, the embedded device has a dedicated function within a mechanical and/or electrical system. The mechanical and/or electrical system can be controlled by the action. For example, the device is an offline device. In this case, the device is not connected to a network, in particular to the internet.

For example, the device is configured to execute the method to transform an acoustic signal, i.e. a voice signal of a user of the device, to the command.

According to at least one embodiment of the method, a set of pseudo words is provided, wherein each pseudo word of the set of pseudo words is representative for more than one real word of a set of real words, which is provided for a pronunciation model. For example, the pronunciation model maps phonemes to graphemes as described in more detail below.

Exemplarily, in order to provide the set of pseudo words, a particularly large set of real words is provided. "Particularly large" means here that at least 10, at least 1000, in particular at least 3000, real words are comprised by the set of real words. The set of pseudo words is exemplary generated dependent on the set of real words, wherein each pseudo word of the set of pseudo words is phonetically close to the real words, but the pseudo words are not the real words themselves. In other words, the set of pseudo words represents a phonetic approximation of the set of real words. This is to say that each pseudo word of the set of pseudo words sounds like several real words of the set of real words and at the same time is not any real word.

According to at least one embodiment of the method, an acoustic signal is mapped to phonemes by an acoustic model. For example, the acoustic signal is recorded and transcribed to phonemes by the acoustic model. The acoustic signal is, for example, the voice signal.

According to at least one embodiment of the method, at least one output word is determined dependent on the phonemes and the pronunciation model. For example, the output word is representative for the acoustic signal.

For example, the phonemes are mapped to graphemes by the pronunciation model. For example, a grapheme is a smallest meaning-distinguishing unit in a writing system that represents a phoneme or phoneme sequence, i.e. a letter. A phoneme is representative, for example, for how the grapheme is pronounced. For example, a phoneme is representative for one grapheme or more than one graphemes.

According to at least one embodiment of the method, the command is determined dependent on the at least one output word, the set of pseudo words and a set of command words, wherein a device performs an action dependent on the command.

In particular, the command words are different to the real words and/or different to the pseudo words.

For example, speech recognition methods work with a finite state grammar and a limited vocabulary. One of the technical challenges is the ability to successfully recognize a valid command from an invalid command, i.e. a command being out-of-grammar.

For example, the determination of the command includes a query, wherein the output word is compared to the set of pseudo words. Exemplarily, if the command comprises any of the set of pseudo words, the command is invalid. However, if the command comprises only an output word being represented by the set of command words, the command is valid.

An idea of the method described herein is, inter alia, to provide a set of pseudo words and determine the command based on the set of pseudo words and the command words. Therefore, the method is configured to recognize and reject an invalid output phrase, comprising at least one pseudo word of the set of pseudo words. This is important for speech recognition systems in the industrial segment. An incorrectly recognized command can cause efficiency losses during operation, such as starting an unwanted action and/or cause injury or equipment damage hazard. When the invalidation of input, i.e. the acoustic signal, is missing, speech recognition system tries to associate any sentence to a supported command. This causes false detection of commands with hazards mentioned above.

Since each pseudo word of the set of pseudo words is representative for more than one real word of a set of real words, the set of pseudo words is comparably small and thus the method can be advantageously carried out particularly fast, and thus adding this set of pseudo words to the pronunciation and/or a language model does not make these models dramatically larger, allowing the method to be carried out particularly fast.

According to at least one embodiment of the method, a language model is provided dependent on the set of pseudo words. For example, the language model determines a likelihood of a word to be determined as an output word in an output phrase depended on a sequence of output words in a given context based on a grammar.

The acoustic model is implemented, for example, within a statistical Markov model, e.g. a Hidden-Markov-Model. The grammar used is exemplarily defined in a JSpeech Grammar Format, JSGF for short.

According to at least one embodiment of the method, at least one output phrase is generated dependent on the at least one output word by the language model. This is to say that the determined output words are fed to the language model. Within the language model the output phrase is generated dependent on the output words using the grammar comprising the set of pseudo words and the set of command words.

For example, the command is determined dependent on the at least one output phrase, the set of pseudo words and the set of command words, wherein dependent on the command a device performs an action.

According to at least one embodiment of the method, the provision of the set of pseudo words comprises a provision of the set of real words. Further, the pronunciation model comprises a determination of the set of pseudo words dependent on the set of real words, wherein the set of pseudo words is smaller than the set of real words. Since the set of pseudo words is smaller than the set of real words, the method can be carried out particularly fast.

According to at least one embodiment of the method, each real word of the set of real words is not equal to any of the pseudo words of the set of pseudo words.

According to at least one embodiment of the method, the language model is dependent on a grammar. For example, the grammar is a preset grammar. This is to say that the grammar is a finite state grammar because the grammar only comprises a specific set of words, sentences and/or phrases.

According to at least one embodiment of the method, the grammar is dependent on the set of pseudo words and the set of command words. Thus, the determination of the output phrase can also lead to an output phrase comprising an output word of the set of pseudo words. Advantageously, having such a grammar, the output phrase can be discriminated, if the output phrase comprises one or more of the pseudo words of the set of pseudo words.

Exemplarily, the command words have a weight equal to the pseudo words of the set of pseudo words.

According to at least one embodiment of the method, at least some of the pseudo words of the set of pseudo words comprised in the grammar have a weight bigger than any of the command words of the set of command words. For example, the weight of the set of pseudo words is 10 times higher, in particular 100 times higher, than the command words of the set of command words. This is to say that the likelihood of determining a pseudo word by the language model is more likely than determining a command word. Such a method is advantageously particularly safe.

According to at least one embodiment of the method, the set of pseudo words is determined by a statistical method comprising the transcription of the set of real words to phonemes.

The statistical method used for the determination of the set of pseudo words can comprise any statistical method being useful to determine the set of pseudo words being smaller than a set of real words.

According to at least one embodiment of the method, the statistical method comprises a selection of some of the phonemes of the set of real words.

According to at least one embodiment of the method, the statistical method comprises a determination of the set of pseudo words dependent on the selection.

According to at least one embodiment of the method, the command is discarded if the at least one output word is one of the pseudo words of the set of pseudo words. Exemplary, the command is discarded if the at least one output phrase comprises one of the pseudo words of the set of pseudo words. This is to say that if the command is discarded since the one output phrase comprises a pseudo word of the set of pseudo words, the device does not perform any action based on this command. Advantageously, due to such a method, the device can be operated particularly safe.

Furthermore, a device for determining a command is specified. The device is configured to perform the method described herein. Therefore, all features and embodiments disclosed in connection with the method are also disclosed in connection with the device and vice versa.

In addition a computer program is specified comprising instruction which, when the computer program is executed by a computer, causes the computer program to execute the method described herein.

Further, a computer readable storage medium is specified on which the computer program described herein is stored.

Exemplary embodiments of the method are explained in more detail below with reference to the figures.

Elements of the same structure or function are marked with the same reference signs across all figures.

Step S1 according to FIG. 1 comprises a mapping of an acoustic signal to phonemes by an acoustic model. The acoustic signal is exemplarily a voice signal of a user of a device, on which the method is carried out.

Subsequently, in step S2, at least one output word is determined dependent on the phonemes and a pronunciation model. The pronunciation model is dependent on a set of pseudo words.

The set of pseudo words is provided in a separate step S3, wherein each pseudo word of the set of pseudo words is representative for more than one real word of a set of real words. The provision of the set of pseudo words can be carried out before all other method steps. For example, the set of real words is a list of most common words of a given language.

After the output word is determined, the method comprises a step S4, wherein a command is determined dependent on the at least one output word, the set of pseudo words and a set of command words. Dependent on the command the device performs an action.

Figure 2:
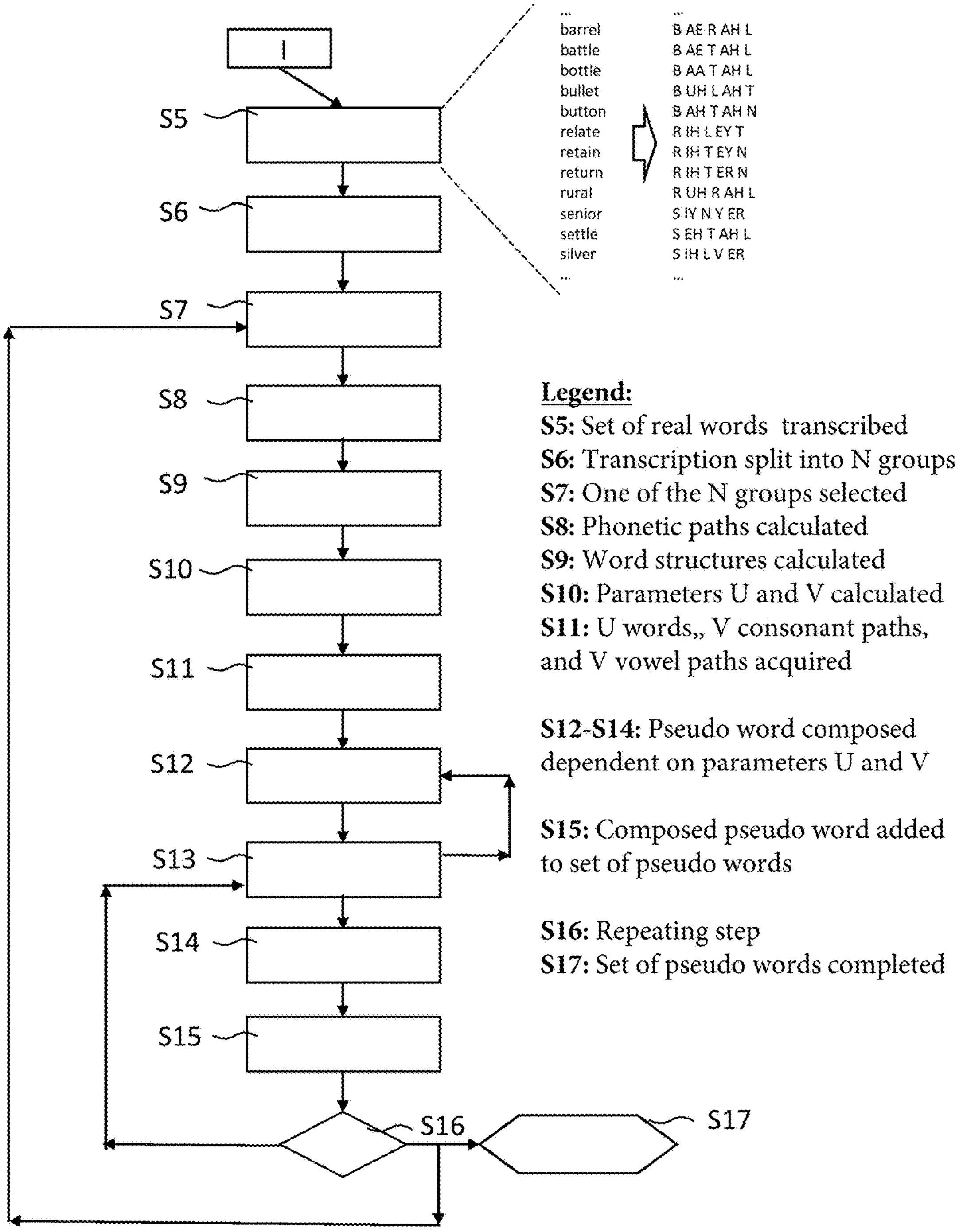
FIG. 2 shows a flowchart of a determination of a set of pseudo words for a method according to an exemplary embodiment.

The flow chart according to FIG. 2 comprises, in order to determine a set of pseudo words, a step S5, in which a set of real words, being an input I, is phonetically transcribed. During the phonetical transcription, each real word of the set of real words is transformed into its phonemes. This is to say that each real word is transformed to one sequence of phonemes. This is schematically shown on the right hand side next to step S5.

Subsequently, in step S6 the phonetical transcription of the set of real words is split into N groups, wherein each group has the same length, i.e. each sequence of phonemes comprise the same amount of phonemes. This is to say that the phonetical transcription is grouped by a count of the phonemes.

In step 7, one of the groups of the N groups is selected. Subsequently, in step 8 phonetic paths are calculated dependent on the phonemes of the group. The phonetic paths comprise vowel paths and consonant paths.

Further, in step 9, word structures are calculated dependent on the phonemes of the group. The word structure is characteristic for a pattern in which vowels and consonants alternate.

In step 10, at least two parameters U and V are calculated. The parameter U is characteristic for most frequent word structures. The parameter V is characteristic for most frequent consonants and vowels. In other words, the parameter V is characteristic for how many phonetic paths are used together with a single word structure, for vowels and consonants respectively.

Step 11 is divided in three substeps, wherein in a first substep, the top U words structures are acquired. In a second substep, the top V consonant paths are acquired and in a third substep, the top V vowel paths are acquired.

Within steps 12, 13 and 14 a pseudo word is composed dependent on the parameters U and V. In step 15, the composed pseudo word is added to the set of pseudo words. These steps are repeated dependent on the parameters U and V, see step 16.

Further, steps 6 to 16 are repeated for all groups N.

Finally, in step 17, the set of pseudo words is completed.

Within steps 8 to 9, the phonemes of the group are filled in matrices according to FIGS. 3, 4 and 5.

The matrix shown in FIG. 3 is representative for a word structure represented by vowels V and consonants C, wherein the rows are ordered from the most frequently occurring word structure to the least frequently occurring word structure. Here, the length of the group is 5, such that all the real words in the group have a phonetic length of 5. For example, the letter C is representative for a consonant and the letter V is representative for a vowel. This is to say this matrix shows patterns, in which vowels and consonants alternate for each real word of the set of real words.

The matrix shown in FIG. 4 is representative for consonant paths of the transcribed phonemes of the group. For example, each element of the matrix counts how often a consonant appears at a specific position.

The matrix shown in FIG. 5 is representative for vowel paths of the transcribed phonemes of the group. For example, each element of the matrix counts how often a vowel appears at a specific position.

For example, the parameter U is calculated to be 2 and the parameter V is calculated to be 3. This is to say that U=2 word structures are provided and the V=3 most frequent consonants and vowels.

Exemplarily, the parameters U and V are calculated by the formulas:

U=ceil(output group size/words per structure

V=words per structure, wherein output group size=ceil(output word count*(input group size/input word count))

- "output word count" is representative for how many pseudo words, in total, are desired. The real count of pseudo words on the output can be slightly higher than this number—this is caused by the ceil( ) operations in the calculations.
- "output group size" is representative for how many pseudo words shall be generated for a given group of real words. Exemplary, for N=5, it means "how many psuedo words shall be generated from the group of real words of phoneme length 5".
- "input group size" is representative for how many real words are in the group N. Exemplary, for N=5, it means "how many input real words with the phoneme length of 5 are comprised".
- "input word count" is representative for the total size of the input real world set, for example 3000.
- "output group size" is representative for the output pseudo word set, the equivalent of what "input group size" is for the input real word set. Exemplary, the sum of input group size for all groups of input real words is equal to the input word count. The sum of output group size for all groups shall be equal (or larger—due to the ceil( )) to the output word count.

The formulas, for example, ensure that the ratio of the phoneme lengths in the pseudo word set is the same as the ratio of phoneme lengths in the input real word set. I.e. if the most frequent phoneme length in the input real word set is 5 and the least frequent phoneme length is 13, then in the output pseudo word set, the most frequent phoneme length is 5, and the least frequent is 13.

Within steps 14 and 15, the pseudo words are composed dependent on the matrices of FIGS. 3 to 5.

In FIG. 6, the V=3 most frequent vowels and the V=3 most frequent consonants are listed. Further, the first word structure of the U=2 word structures is shown.

In FIG. 7, the V=3 most frequent vowels and the V=3 most frequent consonants, i.e. j=0, j=1 and j=2, are composed to a pseudo word according to the U=2 word structures, i=0 and i=1.

REFERENCE SIGNS LIST

I input

S1 . . . S17 steps

The invention claimed is:

1. A method for operating a device based on a command, the method comprising:

providing a set of pseudo words, wherein each pseudo word of the set of pseudo words is representative of and is a phonetic approximation of more than one known real word of a set of real words, which is provided for a pronunciation model, each of the pseudo words thereby being configured to sound like several real words of the set of real words without being any real word, mapping an acoustic signal to phonemes by an acoustic model, determining at least one output word dependent on the phonemes and the pronunciation model, determining the command based on the at least one output word, the set of pseudo words and a set of command words, discarding the command by causing the device to not perform an action associated with the command based on a determination that the command comprises a pseudo word of the set of pseudo words, and causing the device to perform the action associated with the command based on a determination that the command is not discarded and does not include a pseudo word.

2. The method according to claim 1, the method comprising:

mapping the phonemes to at least one output phrase by:

providing a language model dependent on the set of pseudo words, and generating at least one output phrase dependent on the at least one output word by the language model.

3. The method according to claim 1, wherein the provision of the set of pseudo words comprises:

providing the set of real words, determining the set of pseudo words dependent on the set of real words, wherein the set of pseudo words is smaller than the set of real words.

4. The method according to claim 1, wherein each real word of the set of real words is not equal to any of the pseudo words of the set of pseudo words.

5. The method according to claim 2, wherein:

the language model is dependent on a grammar, the grammar is dependent on the set of pseudo words and the set of command words, and at least some of the pseudo words of the set of pseudo words comprised in the grammar have a weight bigger than any of the command words of the set of command words.

6. The method according to claim 1, wherein the set of pseudo words is determined by a statistical method comprising:

transcribing the set of real words into phonemes, selecting some of the phonemes of the set of real words, and determining the set of pseudo words dependent on the selection.

7. A device for determining a command, wherein the device is configured to perform the method according to claim 1.

8. A non-transitory computer-readable medium having processor-executable instructions stored thereon, wherein the processor-executable instructions, when executed by one or more processors, facilitate performance of the method of claim 1.

9. The method according to claim 1, wherein the set of pseudo words is determined by:

transcribing each real word of the set of real words into a sequence of phonemes, and grouping each transcribed sequence of phonemes into one of a plurality of groups based on a length of the respective sequence of phonemes.

10. The method according to claim 9, wherein the set of pseudo words is further determined by:

calculating phonetic paths for each of the transcribed sequences of phonemes of a given group of the plurality of groups, the phonetic paths comprising vowel paths and consonant paths.

11. The method according to claim 10, wherein the set of pseudo words is further determined by:

calculating word structures based on the phonemes of transcribed sequences of phonemes of the given group.

12. The method according to claim 11, wherein the set of pseudo words is further determined by:

calculating a first parameter and a second parameter, the first parameter being characteristic of frequency of word structures and the second parameter being characteristic of frequency of phonetic paths being used together with a single word structure, for vowels and consonants, respectively.

13. The method according to claim 12, wherein the set of pseudo words is further determined by:

selecting one or more of the transcribed sequences of phonemes of the given group as individual pseudo words of the set of pseudo words based on the first parameter and the second parameter.

14. The method according to claim 13, wherein the selecting is based on at least one of:

the most frequent word structures, the most frequent consonant paths, and/or the most frequent vowel paths.

15. The method according to claim 13, wherein the selecting is based on frequency of a phonetic path being present at a single position within a sequence having a same length as the length of the respective sequences of phonemes of the given group.

* * * * *